United States Patent
Maheshwari et al.

(10) Patent No.: US 8,432,870 B2
(45) Date of Patent: Apr. 30, 2013

(54) HANDOVER TECHNIQUES BETWEEN LEGACY AND UPDATED WIRELESS NETWORKS

(75) Inventors: Shashikant Maheshwari, Irving, TX (US); Haihong Zheng, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 680 days.

(21) Appl. No.: 12/499,621

(22) Filed: Jul. 8, 2009

(65) Prior Publication Data

US 2010/0008328 A1   Jan. 14, 2010

Related U.S. Application Data

(60) Provisional application No. 61/134,648, filed on Jul. 11, 2008, provisional application No. 61/111,696, filed on Nov. 5, 2008.

(51) Int. Cl.
*H04W 4/00* (2009.01)

(52) U.S. Cl.
USPC .......... 370/331; 370/344; 370/347; 455/438; 455/439; 455/440; 455/452.2

(58) Field of Classification Search .................. 370/321, 370/322, 326, 331, 337, 347; 455/436, 437, 455/438, 439, 440, 441, 442, 443
See application file for complete search history.

(56) References Cited

U.S. PATENT DOCUMENTS

| | | | |
|---|---|---|---|
| 2006/0092960 A1* | 5/2006 | Lee et al. | 370/412 |
| 2006/0240832 A1* | 10/2006 | Kim et al. | 455/438 |
| 2008/0049759 A1* | 2/2008 | Godavarti et al. | 370/395.5 |
| 2011/0013596 A1* | 1/2011 | Jung et al. | 370/331 |
| 2011/0044287 A1* | 2/2011 | Park et al. | 370/331 |
| 2011/0090879 A1* | 4/2011 | Hamiti et al. | 370/338 |

OTHER PUBLICATIONS

Hamiti, Shkumbin, "The Draft IEEE 802.16m System Description Document", IEEE 802.16m-08/003r5 Broadband Wireless Access Working Group, Nokia, Oct. 3, 2008, pp. 1-121.

* cited by examiner

*Primary Examiner* — Bo Hui A Zhu
(74) *Attorney, Agent, or Firm* — Brake Hughes Bellermann LLP

(57) ABSTRACT

According to an example embodiment, an apparatus may include a processor. The apparatus may be configured to transmit a handover request message from a legacy serving base station to a target updated base station, the request message including an indication that a mobile station is compliant with an updated specification; and receive a handover response message at the legacy serving base station from the target updated base station, the handover response message including one or more updated system parameters assigned to the mobile station for an updated time zone of the target base station.

11 Claims, 10 Drawing Sheets

Figure 2: Prior Art

HANDOVER TECHNIQUES BETWEEN LEGACY AND UPDATED WIRELESS NETWORKS

CROSS-REFERENCE TO RELATED APPLICATION(S)

This application claims priority to: U.S. Provisional application Ser. No. 61/134,648 filed on Jul. 11, 2008, entitled "HANDOVER BETWEEN LEGACY 802.16 AND 802.16M NETWORKS," hereby incorporated by reference, and U.S. Provisional application Ser. No. 61/111,696 filed on Nov. 5, 2008 entitled "HANDOVER TECHNIQUES BETWEEN LEGACY AND UPDATED WIRELESS NETWORKS," also hereby incorporated by reference.

TECHNICAL FIELD

The teachings herein relate generally to handovers of subscriber stations (SS)/mobile stations (MS)/user equipments (UE) in wireless networks, and is particularly relevant to handing over where the base stations (BS) between which the SS hands over operate under different radio protocols. Specific examples are in the context of legacy and updated BSs operating under different IEEE 802.16 protocols (WiMAX).

BACKGROUND

Generally speaking there is a practical need to provide interoperability among newer updated versions of a wireless protocol and pre-existing equipment operating under the older or legacy version. Wireless infrastructure is not updated all at once, and the SSs that were made and sold prior to the time a legacy specification is updated need to be fully supported while they remain in high numbers within the consumer stream of commerce. The same holds true to a somewhat lesser extent for providing interoperability among wholly different radio protocols (or radio access technologies/RAT), so as to enable a SS with capability for multiple protocols to move seamlessly from one area to another while taking advantage of various different radio technologies that are available in those different areas. WiMAX (worldwide interoperability for microwave access) is one such wireless protocol, and within the WiMAX family is the WirelessMAN (wireless metropolitan area network) specification, which uses an OFDMA (orthogonal frequency division duplex multiple access) scheme. Termed herein as legacy WirelessMAN specification is IEEE 802.16. There is an existing infrastructure of BSs and SSs currently in use that are compliant with legacy WirelessMAN.

Now there is ongoing work to update that legacy standard for WirelessMAN, to be published as the IEEE 802.16m standard which intends to amend the IEEE 802.16 WirelessMAN-OFDMA specification to provide an advanced air interface for operation in licensed bands. Term this the updated WirelessMAN specification. As can be expected, it is also to provide continuing support and interoperability for legacy WirelessMAN-OFDMA equipment, including SSs and BSs. This continuing support is limited to the WirelessMAN-OFDMA Reference System which is defined as system compliant with a subset of the WirelessMAN OFDMA capabilities specified by IEEE 802.16-2004 and amended by IEEE 802.16e-2005 and IEEE 802.16Cor2/D3, where the subset is defined by WiMAX Forum Mobile System Profile, Release 1.0 (Revision 1.4.0: 2007-05-02) [excluding specific frequency ranges specified in the section 4.1.1.2 (Band Class Index)]. Since these are to remain supported and will continue in the updated WirelessMAN specification, the WirelessMAN-OFDMA Reference System is termed herein as legacy 802.16 for simplicity. Further, a BS compliant with a legacy specification (but not the updated specification) is termed herein as a legacy BS; a BS compliant with the updated specification is termed herein as an updated BS; and similar for SSs/MSs/UEs. The specific examples given are in the context of legacy WirelessMAN-OFDMA (IEEE 802.16) and updated WirelessMAN-OFDMA (IEEE 802.16m).

In order to support both legacy SSs and updated SSs in an updated BS, a legacy time zone and an updated time zone have been defined in the frame structure of IEEE 802.16m. The time zone is an integer number (greater than zero) of consecutive subframes. The updated time zone and the legacy time zones are time multiplexed (time division multiplex TDM) across the time domain for the downlink (DL; BS to SS). For uplink (UL; SS to BS) transmissions both TDM and FDM (frequency division multiplex) approaches should be supported for multiplexing of legacy and updated SSs. Both DL and UL traffic for the updated SSs can be scheduled in both zones, whereas the DL and UL traffic for the legacy SSs can only be scheduled in the legacy zones. A prior art depiction of the legacy and updated (new) time zones is shown at FIG. 2, reproduced from FIG. 11.4-5 of C80216m-08_003r1 which describes the super-frame structure of IEEE 802.1 6m as currently agreed. Note that the DL legacy and new zones can be partitioned dynamically on a per-frame basis, and so the split shown at FIG. 2 may differ for the DL.

It may be a requirement of the updated specification IEEE 802.16m that the updated BS support handover of a legacy SS to and from a legacy BS and to and from an updated BS, at a level of performance equivalent to handover between two legacy BSs. There are then seen four different handover scenarios between an updated BS and a legacy BS, detailed below with reference to FIG. 1.

Scenario 1: A legacy SS 7 moves from a legacy BS 8 to an updated BS 9 (SS 7 moving left to right in FIG. 1). The legacy SS 7 will then handover to a legacy time zone of the updated BS 9 and therefore should follow the legacy handover protocol.

Scenario 2: A legacy SS 7 moves from an updated BS 9 to a legacy BS 8 (SS 7 moves right to left in FIG. 1). The legacy SS 7 will then handover from a legacy time zone of the updated BS 9 to the legacy BS 8, and therefore should follow the legacy handover protocol.

Scenario 3: An updated SS moves from a legacy BS 8 to an updated BS 9 (left to right in FIG. 1).

Scenario 4: An updated SS moves from an updated BS 9 to a legacy BS 8 (right to left in FIG. 1).

The handover (HO) scenarios 3 and 4 above are anticipated to occur typically at the geographical area where the operator has not upgraded all of its legacy BSs in the network. These types of handovers happen during the infrastructure transition period. Generally during such a transition period is desirable to minimize the impact on the deployed/legacy BS and its interfaces to other BSs or other nodes in the network (R4/R6 interface for WirelessMAN). In addition, such HO may also happen between a service provider that provides legacy service but with no intention of upgrading its network (or who has not yet upgraded) and another service provider with an upgraded network.

SUMMARY

According to an example embodiment, a method may include transmitting a handover request message from a legacy serving base station to a target updated base station, the request message including an indication that a mobile station is compliant with an updated specification; and receiving a handover response message at the legacy serving base station from the target updated base station, the handover response message including one or more updated system parameters assigned to the mobile station for an updated time zone of the target base station.

An apparatus may include a processor. The apparatus may be configured to: transmit a handover request message from a legacy serving base station to a target updated base station, the request message including an indication that a mobile station is compliant with an updated specification; and receive a handover response message at the legacy serving base station from the target updated base station, the handover response message including one or more updated system parameters assigned to the mobile station for an updated time zone of the target base station.

A method may include: receiving, at an updated mobile station from a serving legacy base station, a handover request message including one or more updated system parameters assigned to the mobile station for an updated time zone of a target updated base station; transmitting a handover indication from the updated mobile station to the legacy serving base station; and performing network entry, by the mobile station, in the updated time zone of the target updated base station using the one or more updated system parameters assigned to the mobile station.

According to another example embodiment, an apparatus may include a processor. The apparatus may be configured to: receive, at an updated mobile station from a serving legacy base station, a handover request message including one or more updated system parameters assigned to the mobile station for an updated time zone of a target updated base station; transmit a handover indication from the updated mobile station to the legacy serving base station; and perform network entry, by the mobile station, in the updated time zone of the target updated base station using the one or more updated system parameters assigned to the mobile station.

A method may include receiving, at a target updated base station from a serving legacy base station, a handover request message including an indication that a mobile station for handover is compliant with an updated specification; allocating one or more updated system parameters to the mobile station for an updated time zone of the target base station; and transmitting a handover response message from the target updated base station to the serving legacy base station from the target updated base station, the handover response message including one or more updated system parameters assigned to the mobile station for an updated time zone of the target base station.

According to another example embodiment, a method may include transmitting an association request message from a legacy serving base station to a target updated base station, the request message including an indication that a mobile station is compliant with an updated specification; and receiving an association response message at the legacy serving base station from the target updated base station, the association response message including one or more updated system parameters assigned to the mobile station for an updated time zone of the target base station.

DETAILED DESCRIPTION

Figure 1:
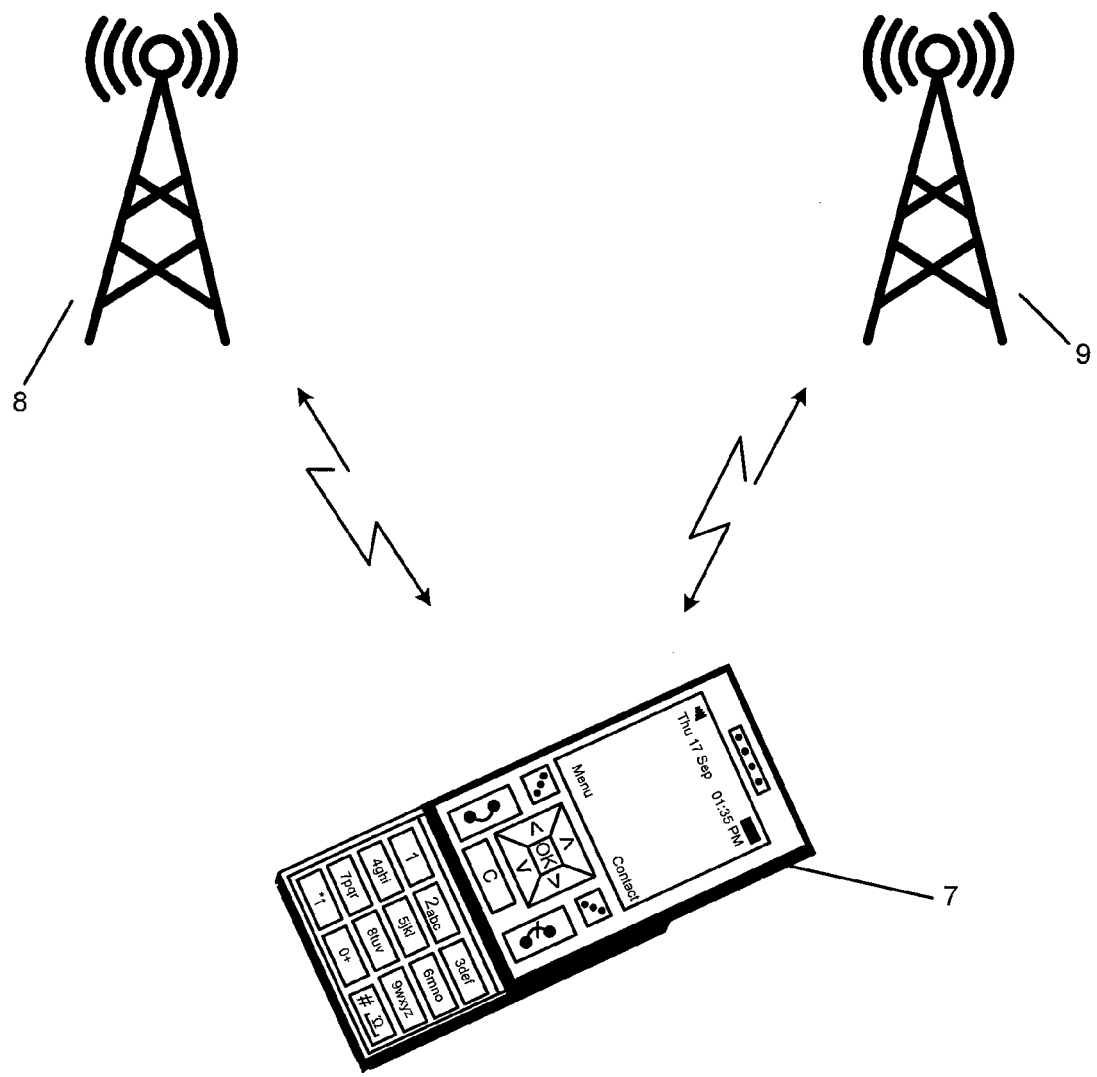
FIG. 1 is a schematic diagram illustrating various handover scenarios for a mobile station between two base stations.
Figure 2:
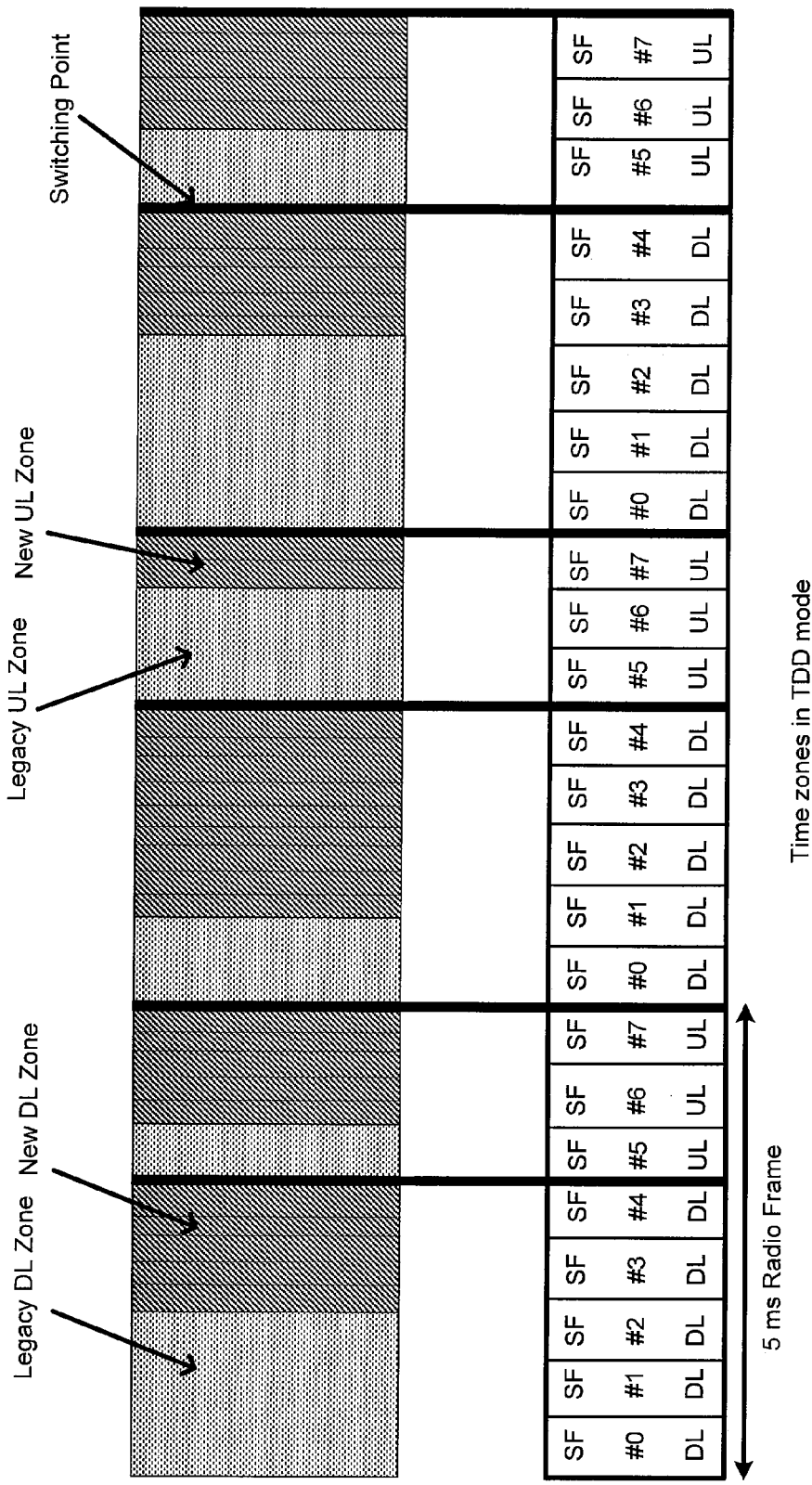
FIG. 2 is a prior art depiction of the legacy and updated (new) UL time zones within an IEEE 802.16m super-frame, reproduced from FIG. 11.4-5 of C80216m-08_003r1.

It is initially noted that the examples and explanations below are in the context of a WiMAX network and particularly the WirelessMAN family of specifications, but embodiments of this invention are not so limited and may be employed for any network protocol or radio access technology, such as for example UTRAN (universal mobile telecommunications system terrestrial radio access network or 3.5G), GSM (global system for mobile communications), WCDMA (wideband code division multiple access, also known as 3G or UTRAN), WLAN (wireless local area network), E-UTRAN (evolved UTRAN, also known as LTE or 3.9G) and the like, in which a SS/MS/UE hands over between base stations/NodeBs that operate using somewhat different protocols. Further, the various names used in the description below (e.g., time zone, Zone Switch Request, etc.) are not intended to be limiting in any respect but rather serve as particularized examples directed to specific WirelessMAN implementations using current WirelessMAN terms for a clearer understanding of the more generalized invention. These terms/names may be later changed in WirelessMAN and they may be referred to by other terms/names in different network protocols, and these teachings are readily adapted and extended to such other protocols.

The inventors have developed three different approaches to implementing HO of an updated SS between a legacy BS and an updated BS, each viable for the WirelessMAN legacy and updated specifications. For other wireless protocols it is understood that one or two of these approaches might be practical and one or another of them may not be transferrable to that protocol due to other considerations.

In accordance with a first aspect of the invention, the legacy BS is enabled to provide information (e.g., broadcast system information) for its neighbor BS that is an updated BS so as to enable HO of the updated SS to HO to the updated BS in an updated time zone. Conceptually, this may be understood as the legacy BS considering its neighbor updated BS as two systems, a legacy BS using legacy zones and an updated BS using updated zones. The legacy BS broadcasts the system information for the legacy zone of the neighbor updated BS in its neighbor advertisement as already defined in the specification for the legacy system. This enables any legacy SS to HO seamlessly to the updated BS. In addition, the legacy BS broadcasts system information for the updated time zone of the neighbor updated BS. This enables the updated SS to HO to the updated BS in the updated zone. The updated system information is provided to the updated SS while that SS is still within the cell of the legacy BS, and the legacy BS may provide it in several different ways detailed below.

Said more generally, this first aspect can be considered as the first (legacy) BS transmitting first information of a second BS (e.g., broadcasting the system information of the legacy zone of the neighbor 802.16m BS) about a first time zone (legacy time zone) that the first BS supports and also transmitting second information of the second BS (e.g., broadcasting the system information of the updated time zone of the neighbor 802.16m BS) about a second time zone (e.g., the updated time zone) that the first BS does not support. The updated SS receives both the first and the second transmitted information, and for the case where the SS is compliant with (or supports) the second time zone the SS uses the second information (but not the first information) to handover to the second BS that supports both the first and the second time zones.

In a first variation to the first aspect, the system information for the updated time zone of the neighbor updated BS may be included in a new TLV (type-length-value; used to encode information as a TLV-tuple) in the neighbor advertisement message that is broadcast to the SS. In this embodiment both the first and second information are in the same message, system information for the neighbor 802.16m BS. In a second variation it may be included in a new message carried in a special service flow that is only established for the updated SS, for example a special service flow that is unicasted to the updated SS. In a third variation it may be included in a multicast message to a group of updated SSs, where the multicast group includes all the updated SSs in the cell. The legacy BS would invite each of the updated SS into the group based on the MAC (medium access control layer) version that the SS indicates during its network entry process. In a fourth variation it may be included in a new broadcast message that is only understandable by the updated SS. As will be appreciated, in the second, third and fourth variations the first and second information are sent in separate messages.

This first aspect has the advantage that it is quite straightforward and provides a HO solution at the level of performance equivalent to handover between two legacy BSs, which is what will be required by the updated IEEE 802.16m specification. However, it does impose changes to legacy BSs on both the air interface (RI interface) and network interfaces (R4 and R6 interfaces), which are sometimes not preferred since at the end of the transition period when no more legacy equipment needs to be supported those changes would either persist or need to be changed again.

According to a second aspect of the invention, there is a HO of the updated SS from a legacy BS to an updated BS in the legacy time zone, followed by the updated SS switching zones with the updated BS from legacy zone to updated zone. From the perspective of the legacy BS from which the updated SS is handed over, the legacy BS only considers the legacy zone of the neighbor updated BS as its neighbor; there is no duality of zones from the perspective of the legacy BS as noted with the first aspect above. The legacy BS broadcasts the system information for the legacy zone of the neighbor updated BS in its neighbor advertisement as is currently defined in legacy specification for the legacy system. The handover of the updated SS from the legacy BS is to the legacy zone of the neighboring updated BS, and uses the legacy procedure.

After the handover, the updated BS detects the SS as an updated SS using the MAC version value, which may be sent by the SS in its initial ranging request, or which the updated BS may obtain from the SS context that is transferred from the legacy BS that was serving prior to the handover. The MAC version sent in a DCD (downlink channel descriptor) message in the legacy time zone indicates that the sender/updated BS supports the updated specification. Based on such information, the SS detects (or determines that) the BS as an updated BS, and so both the updated SS and the updated BS then know that the other party supports the updated specification. The updated BS requests the SS to switch to the updated time zone, or alternatively the SS initiates the zone switch. The SS synchronizes with the updated BS in the updated time zone and performs a zone switch from legacy to updated time zones. During this switch, the updated BS may transmit user data to the updated SS in the legacy zone simultaneously, since the updated SS is not synchronized to the updated time zone until the switch is completed. Alternatively, the zone switch is not performed and the SS stays in the legacy zone after the handover.

Said more generally, according to this second aspect the legacy BS operates as normal and handover the updated SS as if it were a legacy SS with one exception: sending the MAC version value (which shows that the SS being handed over is an updated SS) with the SS context to the updated neighbor BS when handing over an updated SS to the updated neighbor BS. The second (updated) BS receives a handover of the SS from a first (legacy) BS using a first timing structure (first or legacy time zone) of a frame that the first BS supports, determines that the SS supports a second timing structure of the frame (via the SS context with the MAC version value that the second BS receives from the first BS or from the ranging message received from the SS itself), synchronizes the SS to a second timing structure (second or updated time zone) of the frame, switches the synchronized SS from the first timing structure to the second timing structure and thereafter communicates with (handles) the SS according to the second timing structure of the frame while the SS is within a cell of the second BS. For the case where the second BS has user data for the SS prior to the switching being complete (and similarly when the SS has user data for the BS before switching is complete), the second BS schedules and sends/receives the user data to/from the SS according to the first timing structure simultaneous with the synchronizing and switching.

From the perspective of the SS, the SS hands over from a first (legacy) BS to a second (updated) BS using a first timing structure (first or legacy time zone) of a frame that the first BS supports, determines that the second BS supports a second timing structure of the frame (via the DCD message with the MAC version), while sending/receiving the user data to/from the second (updated) BS using a first timing structure (first or legacy time zone), synchronizes itself to a second timing structure (second or updated time zone) of the frame, switches from the first timing structure to the second timing structure and thereafter communicates with the second BS according to the second timing structure of the frame while the SS is within a cell of the second BS.

Within this second aspect of the invention there are detailed below two approaches for how the synchronization procedure may be implemented. The first synchronization implementation is done without modification to the first timing structure/ legacy time zone, and the second synchronization implementation is done with modification to the first timing structure/legacy time zone.

According to the first synchronization implementation, after the HO and after the time that the SS detects that the BS to which it handed over is an updated BS, the SS starts to scan and try to synchronize with the updated BS in the updated time zone. If a one-to-one or one-to-N mapping of the legacy zone preamble and updated zone preamble is defined (e.g., predetermined, as in published in the relevant specification and the mapping rule is stored in the local memory of the SS), the SS only needs to scan for a small number of preambles, and gets synchronized in the updated zone without too much processing or blind detection. Then the SS decodes the DCD message to obtain the base station identifier BSID for the updated zone. If the BSID used in the updated time zone is the same as the BSID used in the legacy time zone that was used for the HO, the SS continues the zone switching procedure. Otherwise, it continues the scanning until the same BSID is found.

According to the second synchronization implementation, by the above procedures the updated BS knows that the SS handed over to it from its legacy neighbor BS is an updated SS, from the legacy BS's report of the SS context or from the SS's ranging message. Knowing this or upon a request sent from MS/SS/UE in the legacy time zone, the updated BS then provides the SS the configuration information of the updated time zone (e.g., the updated time zone preamble) by sending the SS a message in the legacy time zone. In addition, the SS identifier (e.g., temporary ID in the cell or USID universal subscriber identifier, which may be masked at the BS level for example by a mod operation) or a connection identifier as well as a dedicated spreading code (code division multiple access CDMA code) or an action timer could also be provided to the SS. In this case the SS scans and searches for the provided preamble and gets synchronized with the updated time zone and obtains other system information.

As detailed above, after synchronizing with the updated time zone, the SS starts a zone switch procedure. Two different implementations of the zone switch procedure are detailed below, one initiated by the updated BS and one initiated by the SS that was handed over.

According to a first implementation of the zone switch procedure (BS initiated), the SS starts to monitor the DL channels or at least the paging channel in the updated time zone after obtaining all the UL and DL configuration information. This is possible because synchronization is complete but zone switch is not yet performed. The updated BS may obtain the paging cycle for the SS from the access service network gateway (ASN-GW) if it doesn't have. If BS decides to initiate the zone switch, it sends a Zone Switch Advertisement (including MS/SS/UE identifier such as MAC address or temporary identifier assigned before as well as a UL resource for SS to send a reply) in a data channel or the paging channel. If the SS receives such message, it replies with a Zone Switch Request followed by the procedure listed in the SS initiated zone switch procedure below. The BS will send the Zone Switch Advertisement until the action timer that was previously provided to the SS/MS/UE expires.

According to a second implementation of the zone switch procedure (SS initiated), after obtaining all the UL and DL configuration information, the SS starts a zone switch procedure. If the SS is allocated with a dedicated CDMA code as noted in the second synchronization implementation above, the SS sends the CDMA code to the updated BS. Alternatively, the SS uses an uplink control channel to indicate its request for zone switch. Upon detecting the CDMA code, the updated BS allocates resource for the SS to send a Zone Switch Request, after which the SS sends and the BS receives on the allocated resources the Zone Switch Request. Alternative to those resources being allocated as above, the SS can use a contention based bandwidth request (BR) to obtain UL resource on which to send its Zone Switch Request.

The Zone Switch Request includes the SS's identifier such as MAC address. If no temporary identifier such as SS ID or connection identifier is allocated to the SS as is detailed above in the second synchronization implementation, then those fields in the request that would otherwise be used for SSID or connection identifier may then be set as a default value, preferably as may be specified in the 802.16m standard (i.e., similar to the initial ranging connection identifier CID in the legacy standard). Upon receiving such a Zone Switch Request, the BS allocates a temporary SS identifier (MSID/SSID) and/or a connection identifier to the SS in the BS's response to the Zone Switch Request. Alternatively, the MSID/SSID or connection identifier that is assigned beforehand is used to send the message. The BS may also grant resources to the SS to finish other zone switching procedures if necessary (such as a capability exchange, registration, security, or service flow management, as non-limiting examples). A mapping from the SS's legacy context to the SS's updated (802.16m) context may also be done during these procedures.

However implemented, after the zone switch is completed, the BS serves the SS in the updated time zone, and data transmission starts at the updated zone rather than at the legacy time zone. The BS will then stop granting resources to the SS on the legacy zone and release all the other resources such as legacy CIDs that it used in the legacy zone with the SS prior to completion of the zone switch.

This second aspect of the invention has the advantage that there is no modification needed to the legacy BS. This is seen as especially beneficial to the service provider for the legacy service to support HO from its legacy BSs to updated BSs (whether its own or others with which it has HO agreements with) without the need to update its legacy BS. Further, there is no need to transmit both 802.16e and 802.16m system information of one neighbor updated BS from the legacy BS as with the first aspect above. Thus the second aspect is seen, overall, to provide for a reduced system overhead (control signaling overhead) as compared to the first aspect. Additionally, there is no additional delay introduced by the second aspect, other than a normal inter-legacy BS handover delay that is somewhat inherent in all standard upgrades that affect handovers.

According to a third aspect of the invention is context mapping support when an updated SS is handed over from an updated BS to a legacy BS. To support handover of an 802.16m compliant SS from an 802.16m time zone of an updated BS to a legacy BS that does not support the updated time zone, the updated BS communicates with the legacy BS using legacy R4/R6 protocol over the network backbone (e.g., via higher level network nodes such as the ASN-GW shown at FIG. 3). The handover context for connections (such as general SS information, connection information, SS capability information, security information, service flow information, MAC state information included in the automatic-repeat-request ARQ context, for example) needs to be mapped from the updated 802.16m format into the legacy format if there is a difference. Such mapping can be derived by the SS and BS if the mapping is defined in the published standards (e.g., the mapping rule will be stored in the local memory of the apparatus/SS/BS), or the mapping may be performed by the updated BS and transferred to the updated SS in the handover request/response message exchange. The handover context for connections is also transferred, in the legacy format, to the legacy BS that receives the updated SS in the handover.

This third aspect has the advantage that no modification is needed to the legacy BS. As above, this is seen to be especially beneficial to the service provider for the legacy service to support HO from an updated BS without the need of updating all of its legacy BSs at once. Further, no extra delay is introduced other than normal inter-legacy BS handover delay.

Figure 3:
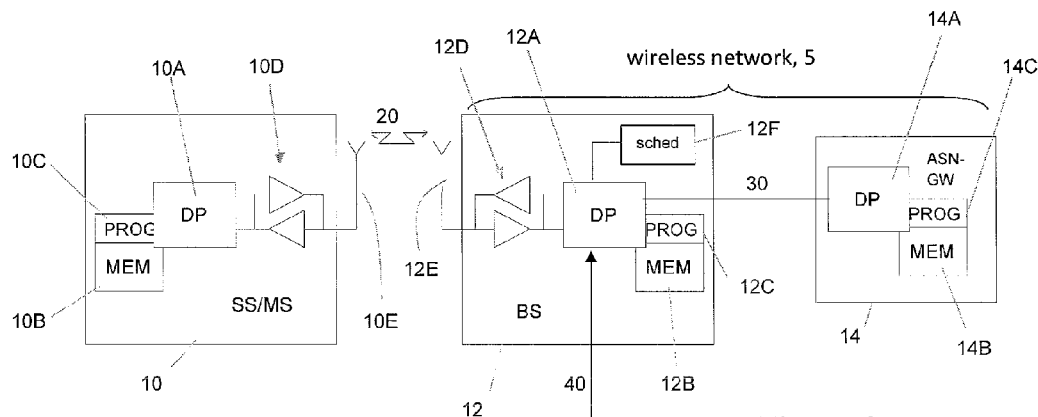
FIG. 3 is a simplified block diagram of various electronic devices that are suitable for use in practicing the exemplary embodiments of this invention.

Reference is now made to FIG. 3 for illustrating a simplified block diagram of various electronic devices that are suitable for use in practicing the exemplary embodiments of this invention. In FIG. 3 a wireless network 5 is adapted for communication between a MS/SS/UE 10 and a BS 12 (e.g., base station, Node B, access node). The network 5 may include an ASN-GW/serving mobility entity MME/radio network controller RNC 14 or other radio controller function known by various terms in different wireless communication systems. The MS/SS/UE 10 includes a digital processor (DP) 10A, a memory (MEM) 10B that stores a program (PROG) 10C, and a suitable radio frequency (RF) transceiver 10D coupled to one or more antennas 10E (one shown for UE 10) for bidirectional wireless communications over one or more wireless links 20 (R1 interface) with the BS 12.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The BS 12 also includes a DP 12A, a MEM (memory) 12B, that stores a (program) PROG 12C, and a suitable RF transceiver 12D coupled to one or more antennas 12E (one shown). The BS illustrated may embody the legacy BS or the updated BS detailed above. Regardless of which, there is in some networks a first data path 40 (in WirelessMAN the R4 interface is generally not directly between neighbor BSs as is shown at FIG. 3 but rather between ASN-GWs of neighboring BSs) between the legacy BS and its neighbor updated BS that is used to exchange HO-related information about the MS/SS/UE 10. The BS 12 may also be coupled via a second data path 30 (e.g., R6 interface) to the serving or other ASN-GW/MME/RNC 14. It is this second data path 30 that forms (a part of) the network backbone noted above. The ASN-GW/MME/RNC 14 includes a DP 14A, a MEM 14B that stores a PROG 14C, and a suitable modem and/or transceiver (not shown separately, embodied in the DP) for communication with the BS 12 over the link 30.

Also within the BS 12 is a scheduler 12F that schedules and allocates to the various MS/SS/UEs under its control for the various UL and DL radio resources. Once scheduled, the BS sends messages with the scheduling grants. The scheduling function may be within the DP 12A.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 14A is a clock to enable synchronism among the various apparatus for transmissions and receptions within the appropriate time intervals and slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the MS/SS/UE 10 and similar for the other MEM 12B and DP 12A of the BS 12, or by hardware, or by a combination of software and/or firmware and hardware in any or all of the devices shown.

In general, the various embodiments of the MS/SS/UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Figure 4:
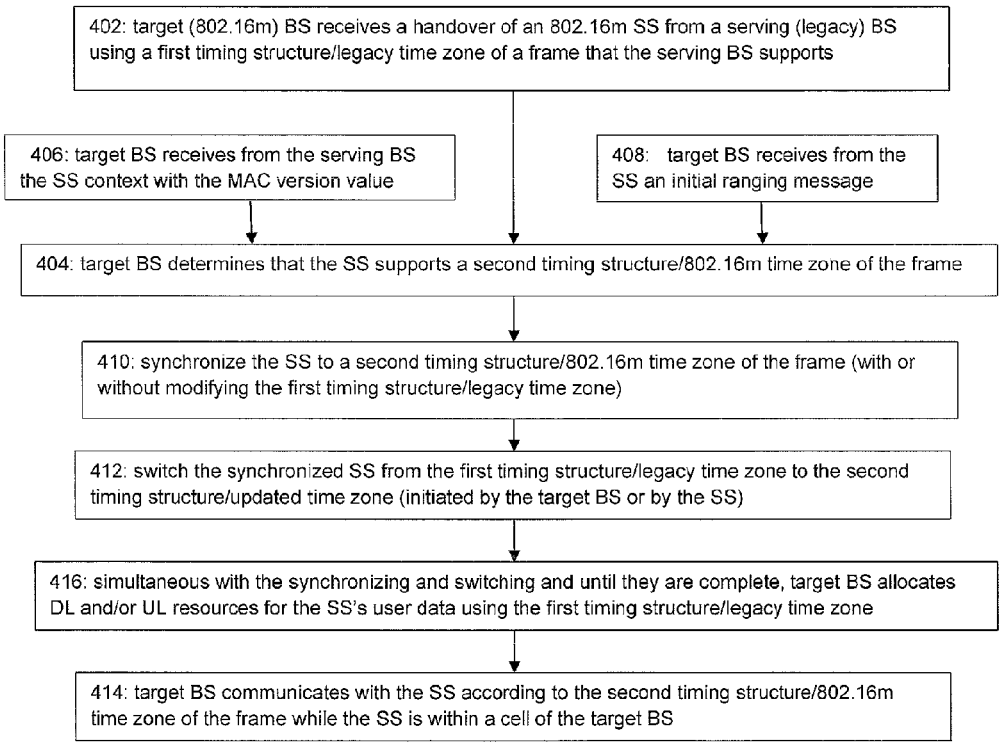
FIG. 4 is a process flow diagram according to an exemplary embodiment of the invention.

In one respect the second aspect of the invention detailed above such as those related to the BS may be embodied as a method, an apparatus, and/or a memory embodying a computer program executable by a digital processor to perform actions directed toward performing a handover of a subscriber station. As detailed at FIG. 4, such embodiments include a target (802.16m) BS receiving at block 402 a handover of an 802.16m SS from a serving (legacy) BS using a first timing structure/legacy time zone of a frame that the serving BS supports. At block 404 the target BS determines that the SS supports a second timing structure/802.16m time zone of the frame. By block 406 this determination is from the SS context with the MAC version value that the target BS receives from the serving BS, or by block 408 the determination is by the ranging message that the target BS receives from the SS itself. At block 410 the target BS synchronizes the SS to a second timing structure/802.16m time zone of the frame. As detailed above, such synchronization may be done in one instance without modifying the first timing structure/legacy time zone, and in another instance it is done by modifying the first timing structure/legacy time zone. At block 412 the synchronized SS is switched from the first timing structure/legacy time zone to the second timing structure/updated time zone. As detailed above, such zone switching is initiated in one instance by the target BS and is initiated in another instance by the SS. At block 414 the target BS communicates with the SS according to the second timing structure/802.16m time zone of the frame while the SS is within a cell of the target BS. For the case where the target BS has user data for the SS prior to the switching of block 412 being complete, the target BS sends/receives the user data to the SS at block 416 according to the first timing structure/legacy time zone simultaneous with the synchronizing and switching.

Similarly the second aspect of the invention from the perspective of the MS/SS/UE may be embodied as a method, an apparatus, and/or a memory embodying a computer program executable by a digital processor to perform actions directed toward changing timing structure in association with a handover. The specific actions largely mirror those shown in FIG. 4, and in particular such embodiments include the SS handing over from a serving BS to a target BS using a first timing structure (first or legacy time zone) of a frame that the serving BS supports, determining that the target BS supports a second timing structure of the frame (via the DCD message with the MAC version), while sending and receiving user data to and from the target BS in the first timing structure (first or legacy time zone), synchronizes itself to a second timing structure (second or updated time zone) of the frame and switches from the first timing structure to the second timing structure and thereafter communicates with the target BS according to the second timing structure of the frame while the SS is within a cell of the target BS.

For the aspects of this invention related to the BS (or more generally to the network) side of the multiplexed transmissions), embodiments of this invention may be implemented by computer software executable by a data processor of the BS 12, such as the processor 12A shown, or by hardware, or by a combination of software and hardware. For the aspects of this invention related to the subscriber equipment side of the handover, embodiments of this invention may be implemented by computer software executable by a data processor of the MS/SS/UE 10, such as the processor 10A shown, or by hardware, or by a combination of software and hardware. Further in this regard it should be noted that the various logical step descriptions above and with respect to FIG. 4 may represent program steps, or interconnected logic circuits, blocks and functions (e.g., of an integrated circuit IC), or a combination of program steps and logic circuits, blocks and functions.

Figure 5:
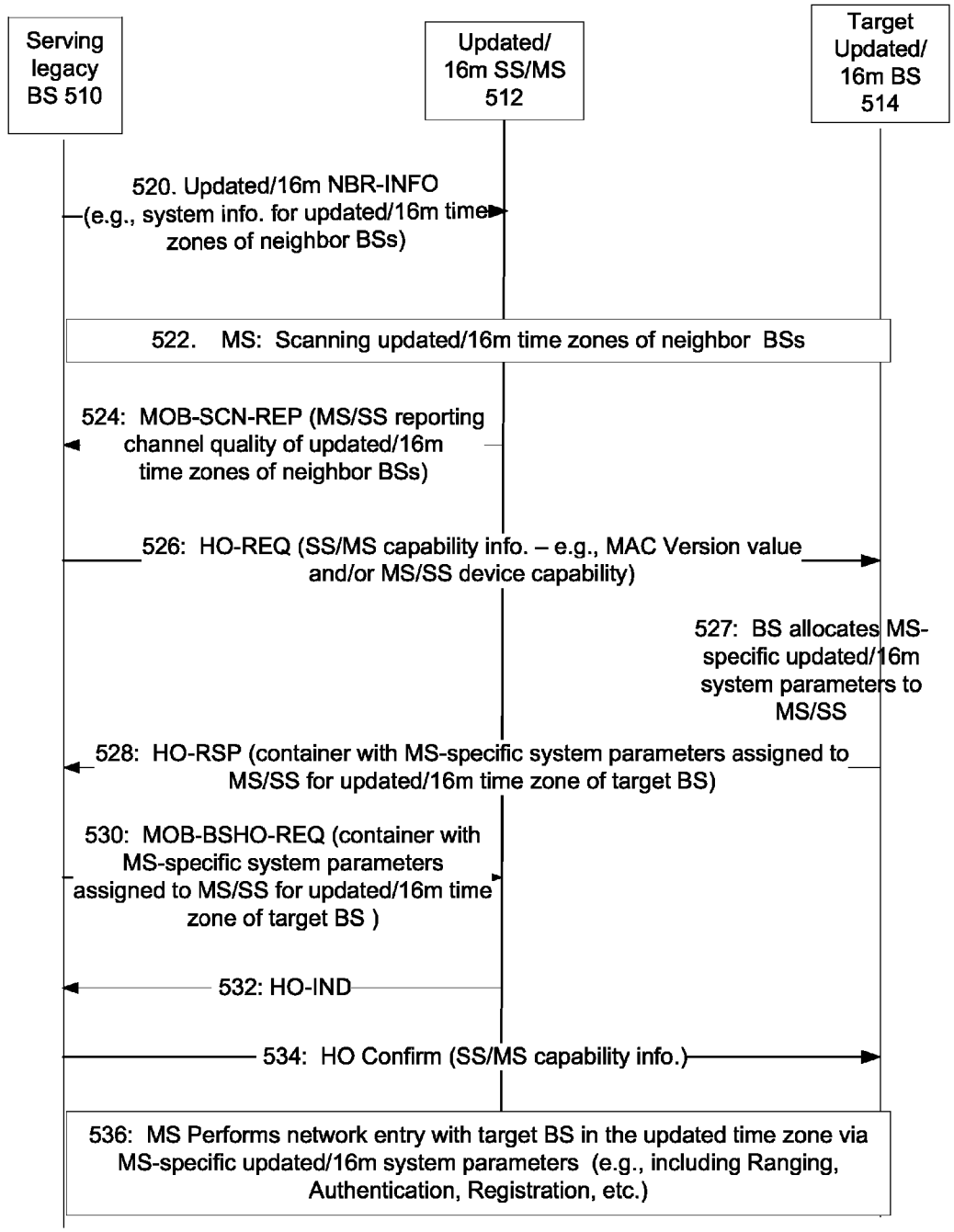
FIG. 5 is a timing diagram illustrating operation of a handover from a legacy base station to an updated or 802.16m time zone of a target base station.

FIG. 5 is a timing diagram illustrating operation of a handover from a legacy base station to an updated or 802.16m time zone of a target base station. Referring to FIG. 5, a serving legacy base station (BS) 510 currently service an updated/802.16m mobile station/subscriber station (MS/SS) 512. Legacy BS 510 may broadcast, via message 520, system information (e.g., via an updated/802.16m NBR-info TLV) for updated/802.16m time zones for one or more neighbor BSs, which is received by MS 512. The system information for updated/802.16m time zones of message 520 may include, for each neighbor BS, an updated/802.16m preamble offset (e.g., offset or location of updated preamble, such as from the start of the legacy preamble), an updated/802.16m preamble index or preamble ID (which may identify a CDMA code), information identifying a carrier frequency for the updated/802.16m time zone, and other information.

At 522, updated MS 512 may perform scanning on one or more neighbor BSs. For example, MS 512 may scan or receive signals on updated/802.16m time zones (e.g., updated/802.16m preambles or other updated 802.16m signals) of one or more neighbor BSs listed in the message 520, for example. MS 512 may determine or measure the channel quality (e.g., received signal strength indication or RSSI, or carrier to interference and noise ratio or CINR) of signals from an updated/802.16m time zone of one or more neighbor BSs, and may identify one or more "best" BSs, or those BSs having updated/802.16m time zones with a highest or best channel quality, for example.

At 524, the MS 512 may send a scanning report (MOB-SCN-REP) to report a channel quality of an updated/802.16m time zone of one or more neighbor BSs, such as for a group of "best" or "highest" quality updated/802.16m time zone signals, since these updated/802.16m time zones or BSs may provide the best candidates for handover for the MS 512, for example. Serving legacy BS 510 may then, for example, select one of the updated/802.16m BSs (or one of the updated/802.16m times zones of a BS) listed in the scanning report (524) as a target updated/802.16m BS for handover (or possible handover) for MS 512.

At 526, serving legacy BS 510 sends, e.g., via backbone network, a handover request (HO-REQ) message to the selected target updated/802.16m BS 514, indicating a proposed handover of MS 512 from BS 510 to BS 514. The HO-REQ message (at 526) may identify the MS 512, for example, by its MAC address, station ID or other identifier. According to an example embodiment, the serving legacy BS 510 may also inform the target updated/802.16m BS 514 whether or not the MS 512 is compliant with the updated/802.16m specification. Thus, the serving legacy BS 510 may notify or inform the target updated/802.16m BS 514 whether the MS 512 is a legacy MS (compliant with the legacy specification but not the updated/802.16m specification) or an updated MS (compliant with the updated/802.16m specification). A number of different fields or signals may be used to indicate whether the MS 512 is a legacy MS or an updated/802.16m MS.

According to one example embodiment, the serving legacy MS may send (or provide) a MS capability information for MS 512 to target updated/802.16m BS 514, e.g., via the HO-REQ message 526. The MS capability information (e.g., which may be included within the HO-REQ message) may describe or identify capabilities of the MS 512. For example, the MS capability information may include: 1) a MAC version value to identify the highest or latest version of the 802.16 specification that the MS supports or is compliant with (e.g., indicating compliance with 802.16m specification, or an earlier version of the 802.16m specification). For example, the MAC version value for MS 512 may have been provided by the MS 512 to the serving legacy BS 510 during network entry at BS 510 by MS 512, and the serving legacy BS 510 may pass on this information to the target BS 514; and/or 2) MS device capability, which may indicate the MS's device capability or capability of one or more features, such as HARQ (Hybrid ARQ) capability, multi-carrier capability, the carrier frequency(ies) that the MS supports, etc.

At 527, the target updated/802.16m BS 14 allocates system parameters to the MS 512 based on whether the MS 512 is a legacy MS or an updated/802.16m MS (e.g., based on the MAC version value for MS 512). Different system parameters may be used for the updated/802.16m specification, as compared to system parameters of a legacy specification. System parameters may include, for example, a station ID or CID (Connection identifiers), dedicated ranging codes or CDMA codes for ranging, an Action time (time period during which the MS should transmit the dedicated ranging code to the target BS, e.g., via dedicated ranging slot or ranging resources); authentication parameters, such as, for example, a nounce that may be provided to the target BS to obtain one or more keys. In some cases, different types and different format of system parameters may be used for legacy specification vs. the updated/802.16m specification. Therefore, the target BS 514 needs to know whether the MS 512 is performing handover to the legacy time zone of BS 514 (e.g., as a legacy MS), or to the updated/802.16m time zone of BS 514 (e.g., as an updated/802.16m MS), so the target BS 514 may allocate appropriate system parameters to the MS 512 for handover. For example, the target BS 514 may allocate MS-specific legacy system parameters to the MS 512 if handover is being performed to legacy time zone or if the MS 512 is a legacy MS. Likewise, the target BS 514 may allocate MS-specific updated/802.16m system parameters to the MS 512 if handover is being performed to the updated/802.16m time zone or if the MS 512 is an updated/802.16m MS.

Thus, as shown at 527, if the MAC version value for MS 512 indicates updated/802.16m, then target BS 514 may allocate to MS 512 one or more MS-specific updated/802.16m system parameters (MS-specific system parameters assigned to MS 512 for updated/802.16m time zone) for handover, including, for example: an updated/802.16m station ID, which may be a 12 bit station ID; an updated/802.16m ranging code and a dedicated ranging slot or ranging resources within the updated/802.16m time zone; an updated/802.16m action time; an updated/802.16m authentication parameter(s) (e.g., nounce) and/or other updated/802.16m system parameters.

At 528, the target updated/802.16m BS 514 may send, e.g., via a backbone network, a handover response (HO-RSP) message to the serving legacy BS 510. The handover response message may include a container (or container TLV) that may include the one or more allocated MS-specific system parameters assigned to the MS 512 for updated/802.16m time zone of target BS 514. Thus, for example, the container TLV may include the allocated MS-specific updated/802.16m system parameters such as updated/802.16m station ID, an updated/802.16m ranging code and a dedicated ranging slot or ranging resources within the updated/802.16m time zone; an updated/802.16m action time; an updated/802.16m authentication parameter(s), etc.

At 530, the serving legacy BS may send or transmit to MS 512, e.g., via wireless communications link, a base station handover request message (MOB-BSHO-REQ) to request a handover to the target BS 514. The base station handover request message at 530 may include the container, including one or more updated/802.16m system parameters assigned to the MS 512. Thus, one or more of the MS-specific system parameters assigned to the MS 512 for updated/802.16m time zone of target BS 514 may be forwarded by serving legacy BS 510 to the MS 512 via the base station handover request/response message (MOB-BSHO-REQ/MOB-BSHO-RSP) at 530. The MS or BS may initiate handover. If MS is initiating handover, the BS will send MOB-BSHO-RSP, and if BS initiates handover then BS will send MOB-BSHO-REQ, at 530. Either of these messages may include the container, including one or more updated/802.16m system parameters assigned to the MS 512. In an example embodiment, the container may provide a way for the legacy BS 510 to transparently receive and forward updated/802.16m system parameters.

According to an example embodiment, instead of including all the updated/802.16m system parameters within the container TLV, the target BS may include one or more of the system parameters, outside of the container, as a legacy system parameter, e.g., within the HO-RSP message at 528. The serving legacy BS may then forward both the container (containing the updated/802.16m system parameters) and one or more legacy system parameters to the MS 512, e.g., via MOB-BSHO-REQ/RSP message at 530. Both the target BS 514 and the updated/802.16m MS 512 may map the one or more legacy system parameter(s) to one or more corresponding updated/802.16m system parameters. In this manner, system parameters may be more efficiently transmitted, e.g., there may be no need to transmit some of the updated/802.16m system parameters in the container if they can be mapped or determined from legacy system parameters that may be transmitted anyway, for example.

For example, 802.16e may use a 16 bit basic CID (connection identifier) and one or more 16 bit (e.g., global) transport flow IDs. Whereas, the updated/802.16m specification may use, for example, a 12 bit station ID and a 4 bit (local or unique only to MS) flow ID. Thus, both the target BS 514 and the MS 512 may map the legacy 16 bit basic CID to an updated/802.16m 12 bit station ID, and may map each of the legacy 16 bit transport flow IDs to a corresponding updated/802.16m 4 bit flow ID. Thus, according to an example embodiment, the updated/802.16 station IDs and flow IDs may be determined from the corresponding legacy information, without explicitly transmitting the updated/802.16m station IDs/flow IDs. The legacy transport flow IDs may be mapped in ascending order, for example, to updated flow IDs. Thus, for example, legacy transport flow ID 30 may be mapped to updated/802.16m flow 1, and legacy transport flow 92 may be mapped to updated/802.16m flow 2, as examples. This is merely an example embodiment, and other system parameters may be similarly mapped (or determined) from legacy values to counterpart (or corresponding) updated/802.16m values.

At 532, updated/802.16m MS 512 may send or transmit, via wireless network, a handover indication (HO-IND) to the serving legacy BS 510, confirming handover will be performed to the target BS 514), e.g., in response to the MOB-BSHO-REQ/RSP, at 530.

At 534, the serving legacy BS 510 may send, e.g., via backbone network, a handover confirmation (HO-confirm) to the target BS 514, confirming that a handover of MS 512 will be performed for MS 512, e.g., to the updated/802.16m time zone of the target BS 514. At 534, the handover confirmation may include the MS capability information, e.g., including the MAC version value and/or the MS device capability for MS 512. The MAC version value may indicate updated/802.16m specification. Thus, e.g., in response to this handover confirmation, the target BS 514 may allocate updated/802.16m resources (or resources in the updated/802.16m time zone of the target BS), if not already allocated.

At 536, the MS 512 may perform network entry (e.g., which may include ranging, authentication, registration, etc.) with the target BS in the updated/802.16m time zone of the target BS via the allocated MS-specific updated/802.16m system parameters. Thus, the MS 512 may perform network entry with the target BS using the updated/802.16m system parameters and/or using messages, resources, timing and protocol, etc. that is compliant with the updated/802.16m specification. For example, MS 512 may perform ranging with the target BS using the allocated MS-specific updated/802.16m ranging code(s) and using the ranging slot or ranging resources allocated to the MS 512 in the updated/802.16m time zone of the target BS 514. Also, the MS 512 may perform authentication using one or more allocated updated/802.16m authentication parameters and/or via resources allocated in the updated/802.16m time zone of the target BS 514, for example.

Figure 6:
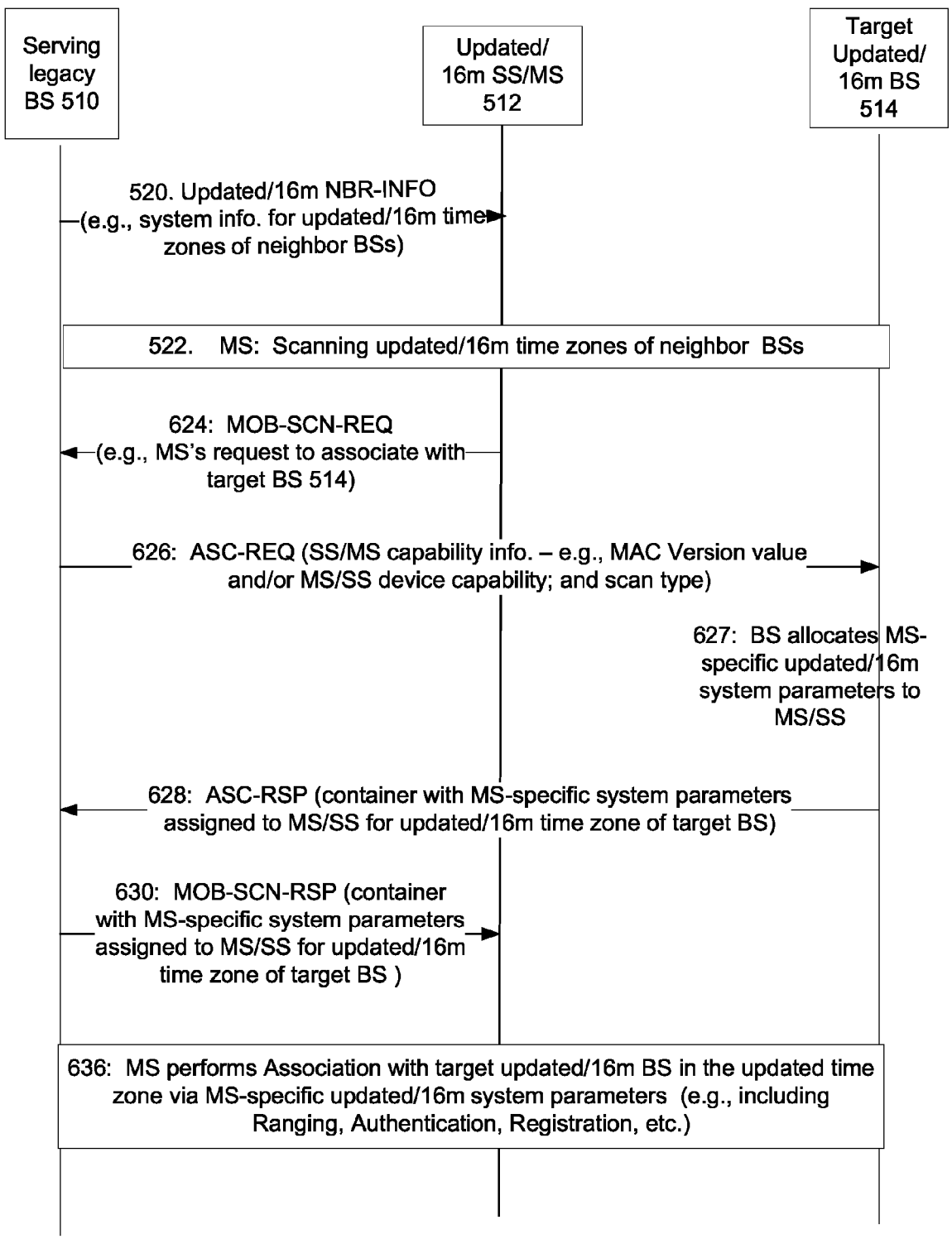
FIG. 6 is a timing diagram illustrating an updated or 802.16m mobile station performing association and ranging with an updated or 802.16m time zone of a target base station.

FIG. 6 is a timing diagram illustrating an updated or 802.16m mobile station performing association and ranging with an updated or 802.16m time zone of a target base station. The flow chart of FIG. 6 is similar to the handover operations shown in FIG. 5, except the operations in FIG. 6 are shown for association.

Operations 520 and 522 are performed in FIG. 6 (same as in FIG. 5). Based on the scanning of updated/16m networks of neighbor BSs, the MS 512 may identify a target updated/802.16m BS 514 for which it would like to associate (e.g., to prepare for a potential future handover to such target updated BS). At 624, the updated MS 512 transmits a mobile scanning request to serving legacy BS 510, which may be considered a request to associate with the target updated/802.16m BS 514.

At 626, serving legacy BS 510 sends, e.g., via backbone network, an association request (ASC-REQ) message to the selected target updated/802.16m BS 514, indicating a proposed association of MS 512 to BS 514. The ASC-REQ message (at 526) may identify the MS 512, for example, by its MAC address, station ID or other identifier. According to an example embodiment, the serving legacy BS 510 may also inform the target updated/802.16m BS 514 whether or not the MS 512 is compliant with the updated/802.16m specification. Thus, the serving legacy BS 510 may notify or inform the target updated/802.16m BS 514 whether the MS 512 is a legacy MS (compliant with the legacy specification but not the updated/802.16m specification) or an updated MS (compliant with the updated/802.16m specification).

According to one example embodiment, the serving legacy MS may send (or provide) a MS capability information for MS 512 to target updated/802.16m BS 514, e.g., via the ASC-REQ message 626. The MS capability information (e.g., which may be included within the ASC-REQ message 626) may describe or identify capabilities of the MS 512. For example, the MS capability information may include: 1) a MAC version value to identify the highest or latest version of the 802.16 specification that the MS supports or is compliant with (e.g., indicating compliance with 802.16m specification, or an earlier version of the 802.16m specification). For example, the MAC version value for MS 512 may have been provided by the MS 512 to the serving legacy BS 510 during network entry at BS 510 by MS 512, and the serving legacy BS 510 may pass on this information to the target BS 514; and/or 2) MS device capability, which may indicate the MS's device capability or capability of one or more features, such as HARQ (Hybrid ARQ) capability, multi-carrier capability, the carrier frequency(ies) that the MS supports, etc.

At 627, the target updated/802.16m BS 14 allocates system parameters to the MS 512 based on whether the MS 512 is a legacy MS or an updated/802.16m MS (e.g., based on the MAC version value for MS 512). Different system parameters may be used for the updated/802.16m specification, as compared to system parameters of a legacy specification. System parameters may include, for example, a station ID or CID (Connection identifiers), dedicated ranging codes or CDMA codes for ranging, an Action time (time period during which the MS should transmit the dedicated ranging code to the target BS, e.g., via dedicated ranging slot or ranging resources); authentication parameters, such as, for example, a nounce that may be provided to the target BS to obtain one or more keys. In some cases, different types and different format of system parameters may be used for legacy specification vs. the updated/802.16m specification. For example, the target BS 514 may allocate MS-specific updated/802.16m system parameters to the MS 512 if association is being performed to the updated/802.16m time zone or if the MS 512 or if the MS 512 is an updated/802.16m MS.

Thus, as shown at 627, if the MAC version value for MS 512 indicates updated/802.16m, then target BS 514 may allocate to MS 512 one or more MS-specific updated/802.16m system parameters (MS-specific system parameters assigned to MS 512 for updated/802.16m time zone) for association, including, for example: an updated/802.16m station ID, which may be a 12 bit station ID; an updated/802.16m ranging code and a dedicated ranging slot or ranging resources within the updated/802.16m time zone; an updated/802.16m action time; an updated/802.16m authentication parameter(s) (e.g., nounce) and/or other updated/802.16m system parameters.

At 628, the target updated/802.16m BS 514 may send, e.g., via a backbone network, an association response (ASC-RSP) message to the serving legacy BS 510. The association response message may include a container (or container TLV) that may include the one or more allocated MS-specific system parameters assigned to the MS 512 for updated/802.16m time zone of target BS 514. Thus, for example, the container TLV may include the allocated MS-specific updated/802.16m system parameters such as updated/802.16m station ID, an updated/802.16m ranging code and a dedicated ranging slot or ranging resources within the updated/802.16m time zone; an updated/802.16m action time; an updated/802.16m authentication parameter(s), etc. Similar to that described above, in an alternative embodiment, one or more of these system parameters may be provided as legacy parameters, and then mapped by MS 512 and target BS 514 to the corresponding updated/802.16m system parameter(s).

At 630, the serving legacy BS may send or transmit to MS 512, e.g., via wireless communications link, a scanning response message (MOB-SCN-RSP) to confirm that association may be performed by MS 512 to the target BS 514, and identify resources for the association. The scanning response message at 630 may include the container, including one or more updated/802.16m system parameters assigned to the MS 512.

At 636, the MS 512 may perform association (e.g., which may include ranging, authentication, registration, etc.) with the target BS 514 in the updated/802.16m time zone of the target BS via the allocated MS-specific updated/802.16m system parameters. Thus, the MS 512 may perform association with the target BS using the updated/802.16m system parameters and/or using messages, resources, timing and protocol, etc. that is compliant with the updated/802.16m specification. For example, MS 512 may perform ranging with the target BS using the allocated MS-specific updated/802.16m ranging code(s) and using the ranging slot or ranging resources allocated to the MS 512 in the updated/802.16m time zone of the target BS 514. Also, the MS 512 may perform authentication using one or more allocated updated/802.16m authentication parameters and/or via resources allocated in the updated/802.16m time zone of the target BS 514, for example.

Figure 7:
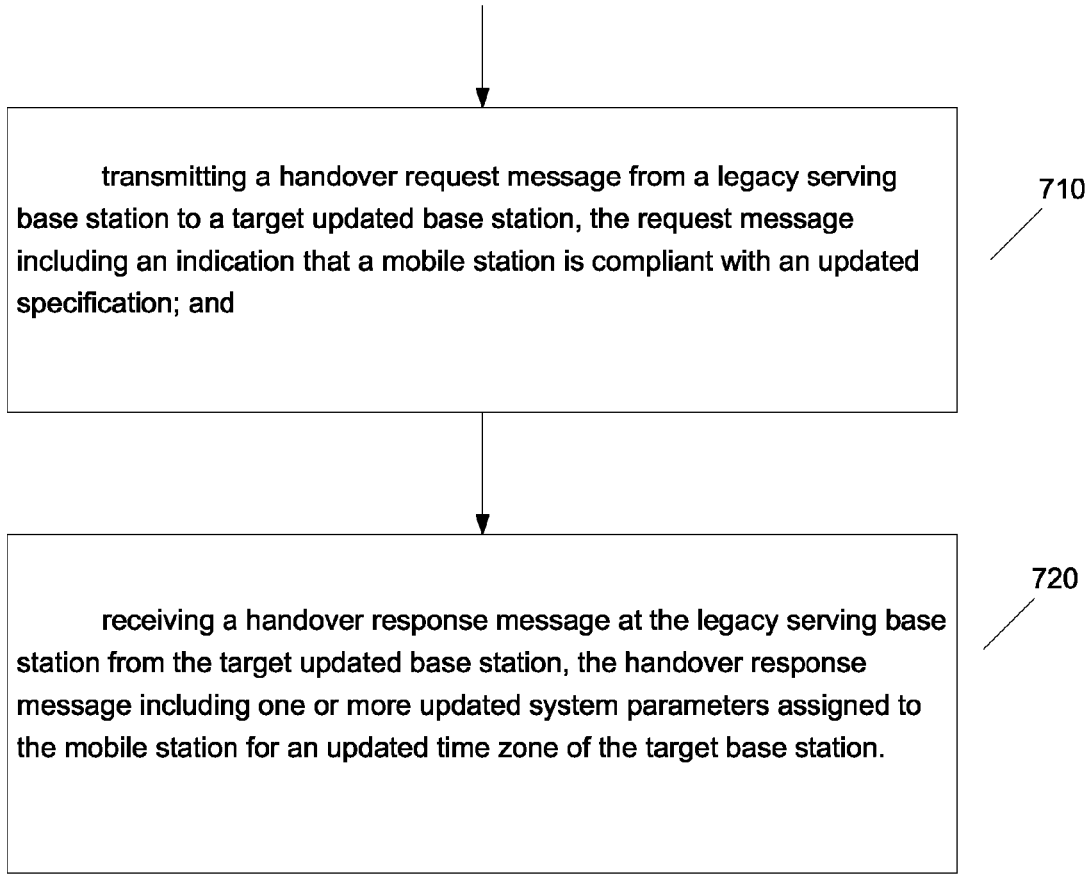
FIG. 7 is a flow chart illustrating operation of a base station according to an example embodiment.

FIG. 7 is a flow chart illustrating operation of a base station according to an example embodiment. Operation 710 may include transmitting a handover request message from a legacy serving base station to a target updated base station, the request message including an indication that a mobile station is compliant with an updated specification; and Operation 720 may include receiving a handover response message at the legacy serving base station from the target updated base station, the handover response message including one or more updated system parameters assigned to the mobile station for an updated time zone of the target base station.

In an example embodiment, the flow chart of FIG. 7 may further include transmitting, from the legacy serving base station to the mobile station, a handover request message including one or more of the updated system parameters assigned to the mobile station for the updated time zone of the target base station.

In the flow chart of FIG. 7, operation 710 may include transmitting a handover request message from the legacy serving base station to the target base station, the request message including a MAC version value for the mobile station.

In the flow chart of FIG. 7, operation 710 may include transmitting a handover request message from a legacy serving base station to a target base station, the request message including mobile station capability information for the mobile station that includes a MAC version value for the mobile station and a mobile station device capability for the mobile station that identifies one or more device capabilities of the mobile station, the mobile station device capability indicating the mobile station's capability regarding one or more of HARQ (Hybrid ARQ), multi-carrier operation, and/or identification of one or more carrier frequency(ies) that the mobile station supports.

In the flow chart of FIG. 7, the legacy serving base station may include a base station that is compliant with a legacy IEEE 802.16 specification, wherein the target updated base station comprises a target base station that is compliant with an updated IEEE 802.16 specification and the mobile station being compliant with an updated specification comprises the mobile station being compliant with the updated IEEE 802.16 specification.

In the flow chart of FIG. 7, the updated IEEE 802.16 specification may include an IEEE 802.16m specification.

In an example embodiment, the flow chart of FIG. 7 may further include sending, from the serving legacy base station to the mobile station, system information for updated time zones for one or more neighbor base stations.

In the flow chart of FIG. 7, operation 720 may include receiving a handover response message at the legacy serving base station from the target updated base station, the handover response message including one or more updated system parameters assigned to the mobile station for an updated time zone of the target base station, and one or more legacy system parameters, wherein one or more of the legacy system parameters may be mapped to a corresponding updated parameter by the mobile station or the target updated base station.

In the flow chart of FIG. 7, operation 720 may include receiving a handover response message at the legacy serving base station from the target updated base station, the handover response message including a container that provides one or more updated system parameters assigned to the mobile station for an updated time zone of the target base station, the updated system parameters including one or more of: an updated station ID, an updated ranging code, a ranging slot or ranging resources within the updated time zone, an updated action time, and/or an updated authentication parameter.

In the flow chart of FIG. 7, operation 720 may include receiving a handover response message at the legacy serving base station from the target updated base station, the handover response message including a container that provides one or more 802.16m system parameters assigned to the mobile station for an 802.16m time zone of the target base station, the 802.16m system parameters including one or more of: an 802.16m station ID, an 802.16m ranging code, a dedicated ranging slot or ranging resources within an 802.16m time zone, an 802.16m action time, and/or an 802.16m authentication parameter.

Figure 8:
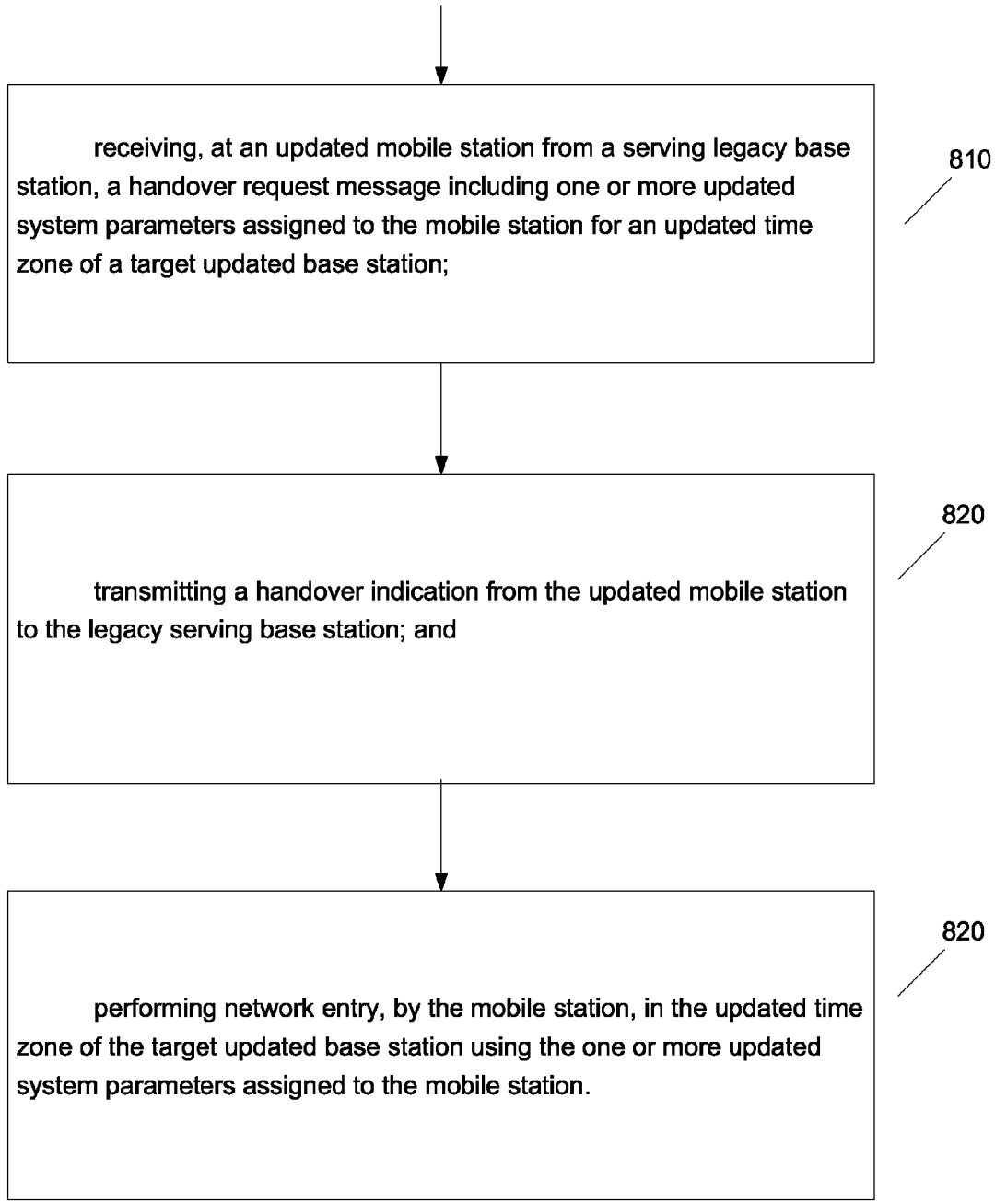
FIG. 8 is a flow chart illustrating operation of a mobile station according to an example embodiment.

FIG. 8 is a flow chart illustrating operation of a mobile station according to an example embodiment. Operation 810 may include receiving, at an updated mobile station from a serving legacy base station, a handover request message including one or more updated system parameters assigned to the mobile station for an updated time zone of a target updated base station; Operation 820 may include transmitting a handover indication from the updated mobile station to the legacy serving base station; and Operation 830 may include performing network entry, by the mobile station, in the updated time zone of the target updated base station using the one or more updated system parameters assigned to the mobile station.

In the flow chart of FIG. 8, the updated system parameters may include an updated ranging code and a ranging slot or ranging resources within the updated time zone of the target updated base station.

In the flow chart of FIG. 8, the mobile station may be an 802.16m mobile station that is compliant with 802.16m specification, and the target updated base station may be an 802.16m target base station that is compliant with 802.16m specification, wherein the updated system parameters comprise an 802.16m ranging code and a ranging slot or ranging resources within an 802.16m time zone of the 802.16m target base station.

In the flow chart of FIG. 8, the updated system parameters may include one or more of an updated station ID, an updated ranging code, a ranging slot or ranging resources within the updated time zone, an updated action time, and/or an updated authentication parameter.

Figure 9:
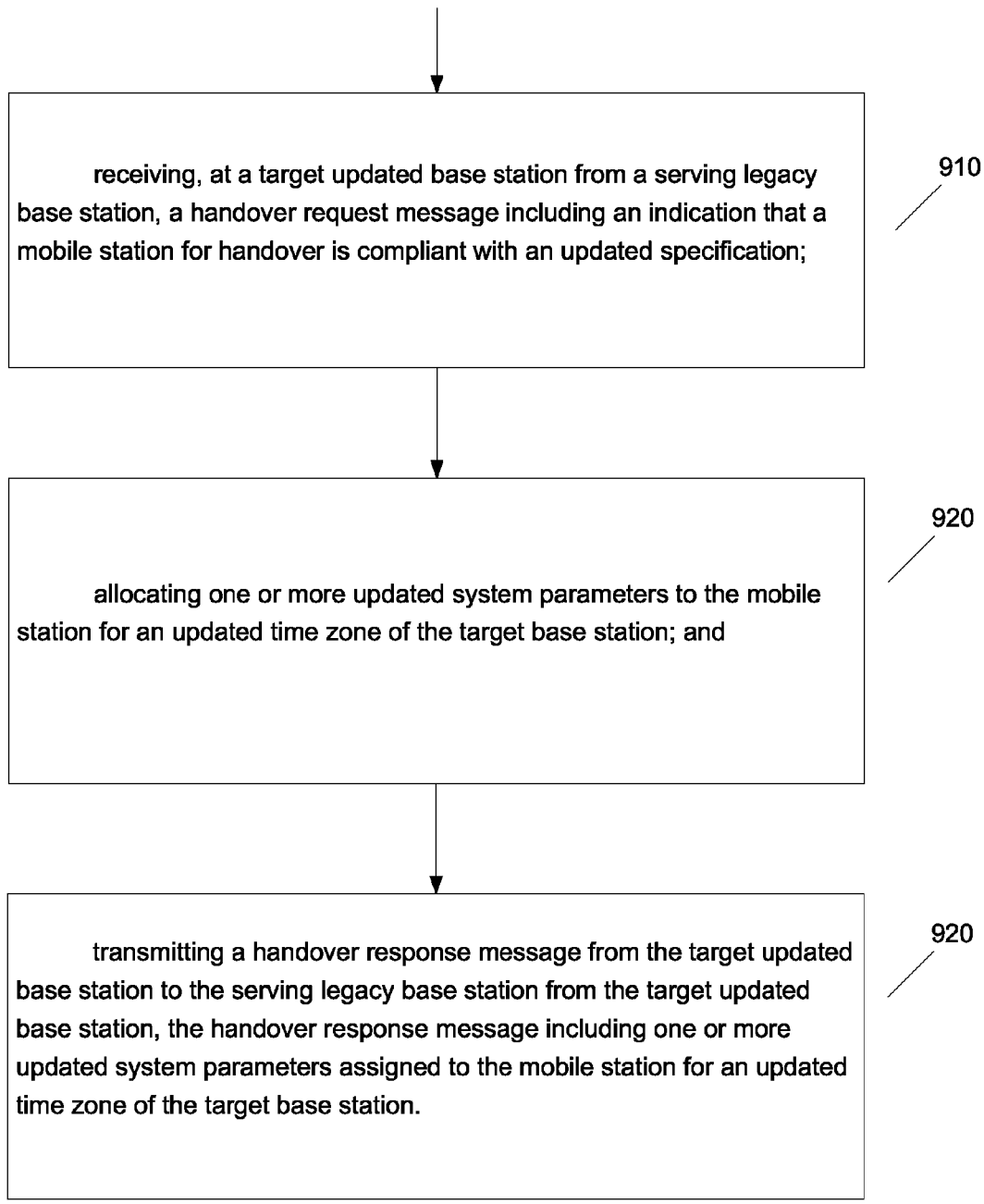
FIG. 9 is a flow chart illustrating operation of a base station according to another example embodiment.

FIG. 9 is a flow chart illustrating operation of a base station according to another example embodiment. Operation 910 may include receiving, at a target updated base station from a serving legacy base station, a handover request message including an indication that a mobile station for handover is compliant with an updated specification; Operation 920 may include allocating one or more updated system parameters to the mobile station for an updated time zone of the target base station; and Operation 930 may include transmitting a handover response message from the target updated base station to the serving legacy base station from the target updated base station, the handover response message including one or more updated system parameters assigned to the mobile station for an updated time zone of the target base station.

Figure 10:
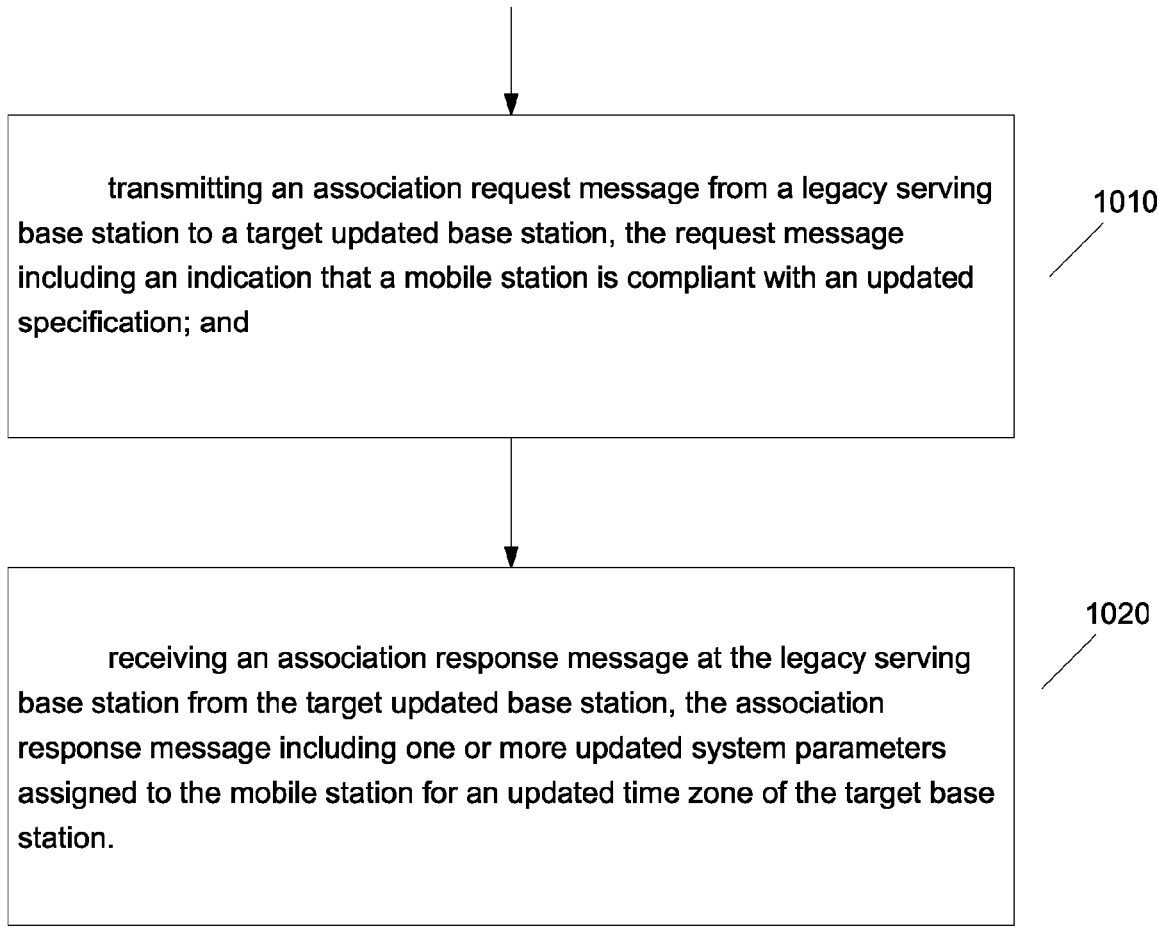
FIG. 10 is a flow chart illustrating operation of a base station according to yet another example embodiment.

FIG. 10 is a flow chart illustrating operation of a base station according to yet another example embodiment. Operation 1010 may include transmitting an association request message from a legacy serving base station to a target updated base station, the request message including an indication that a mobile station is compliant with an updated specification; and operation 1020 may include receiving an association response message at the legacy serving base station from the target updated base station, the association response message including one or more updated system parameters assigned to the mobile station for an updated time zone of the target base station.

The flow chart of FIG. 10 may further include transmitting, from the legacy serving base station to the mobile station, a scanning response message including one or more of the updated system parameters assigned to the mobile station for the updated time zone of the target base station.

According to an example embodiment, an apparatus may include a processor and a transceiver. The apparatus (e.g., the processor and/or transceiver) may be configured to: transmit a handover request message from a legacy serving base station to a target updated base station, the request message including an indication that a mobile station is compliant with an updated specification; and receive a handover response message at the legacy serving base station from the target updated base station, the handover response message including one or more updated system parameters assigned to the mobile station for an updated time zone of the target base station.

According to an example embodiment, an apparatus may include a processor and a transceiver. The apparatus (e.g., the processor and/or transceiver) may be configured to: receive, at an updated mobile station from a serving legacy base station, a handover request message including one or more updated system parameters assigned to the mobile station for an updated time zone of a target updated base station; transmit a handover indication from the updated mobile station to the legacy serving base station; and perform network entry, by the mobile station, in the updated time zone of the target updated base station using the one or more updated system parameters assigned to the mobile station.

According to an example embodiment, an apparatus may include a processor and a transceiver. The apparatus (e.g., the processor and/or transceiver) may be configured to: transmit an association request message from a legacy serving base station to a target updated base station, the request message including an indication that a mobile station is compliant with an updated specification; and receive an association response message at the legacy serving base station from the target updated base station, the association response message including one or more updated system parameters assigned to the mobile station for an updated time zone of the target base station.

Figure 11:
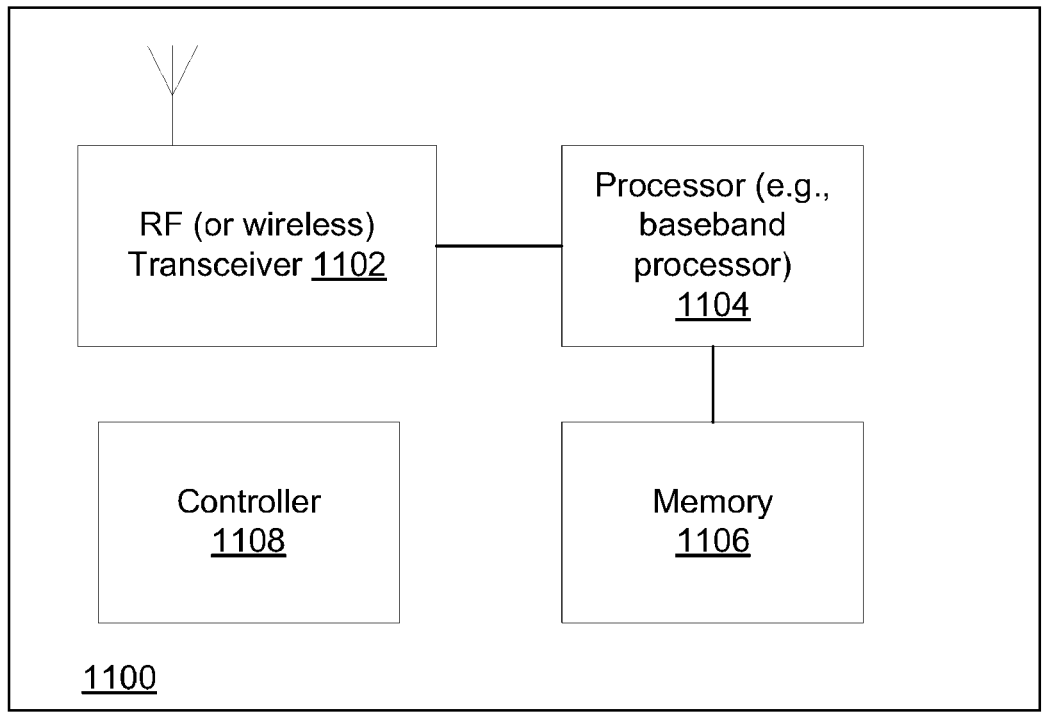
FIG. 11 is a block diagram of a wireless station according to an example embodiment.

FIG. 11 is a block diagram of a wireless station (or wireless node) 1100 according to an example embodiment, such as a base station or mobile station. The wireless station 1100 may include, for example, an RF (radio frequency) or wireless transceiver 1102, including a transmitter to transmit signals and a receiver to receive signals, a processor 1104 to execute instructions or software and control transmission and receptions of signals, and a memory 1106 to store data and/or instructions.

Processor 1104 may also make decisions or determinations, generate frames or messages for transmission, decode received frames or messages for further processing, and other tasks or functions described herein. Processor 1104, which may be a baseband processor, for example, may generate messages, packets, frames or other signals for transmission via wireless transceiver 1102. Processor 1104 may control transmission of signals or messages over a wireless network, and may receive signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

In general, the various embodiments may be implemented in hardware or special purpose circuits, software (computer readable instructions embodied on a computer readable medium), logic or any combination thereof For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the various embodiments as set forth above, or from the scope of the ensuing claims.

What is claimed is:

1. A method comprising:
    transmitting a handover request message from a legacy serving base station to a target updated base station, the request message including an indication that a mobile station is compliant with an updated standard specification of an orthogonal frequency division duplex multiple access (OFDMA) reference system, wherein the legacy serving base station is compliant with a legacy standard specification but not the updated standard specification, and the target updated base station is compliant with both the legacy standard specification and the updated standard specification; and
    receiving a handover response message at the legacy serving base station from the target updated base station, the handover response message including one or more updated system parameters assigned to the mobile station for an updated time zone of the target updated base station and one or more legacy system parameters, wherein the one or more legacy system parameters are mapped to one or more corresponding updated system parameters by the mobile station or the target updated base station, wherein the time zone is an integer number of consecutive subframes.

2. The method of claim 1 and further comprising:
    transmitting, from the legacy serving base station to the mobile station, a handover request message including one or more of the updated system parameters assigned to the mobile station for the updated time zone of the target updated base station.

3. The method of claim 1 wherein the transmitting comprises transmitting the handover request message from the legacy serving base station to the target updated base station, the request message including a medium access control layer (MAC) version value for the mobile station.

4. The method of claim 1 wherein the transmitting comprises transmitting the handover request message from a legacy serving base station to a target updated base station, the request message including mobile station capability information for the mobile station that includes a medium access control layer (MAC) version value for the mobile station and a mobile station device capability for the mobile station that identifies one or more device capabilities of the mobile station, the mobile station device capability indicating the mobile station's capability regarding one or more of hybrid automatic-repeat-request (HARQ) multi-carrier operation, and/or identification of one or more carrier frequency(ies) that the mobile station supports.

5. The method of claim 1 wherein the legacy serving base station comprises a base station that is compliant with a legacy IEEE 802.16 specification, wherein the target updated base station comprises a target base station that is compliant with an updated IEEE 802.16 specification and the mobile station being compliant with an updated specification comprises the mobile station being compliant with the updated IEEE 802.16 specification.

6. The method of claim 5 wherein the updated IEEE 802.16 specification comprises an IEEE 802.16m specification.

7. The method of claim 1 and further comprising sending, from the serving legacy base station to the mobile station, system information for updated time zones for one or more neighbor base stations.

8. The method of claim 1 wherein the receiving comprises receiving the handover response message at the legacy serving base station from the target updated base station, the handover response message including a container that provides one or more updated system parameters assigned to the mobile station for an updated time zone of the target updated base station, the updated system parameters including one or more of: an updated station ID, an updated ranging code, a ranging slot or ranging resources within the updated time zone, an updated action time, and/or an updated authentication parameter.

9. The method of claim 1 wherein the receiving comprises receiving the handover response message at the legacy serving base station from the target updated base station, the handover response message including a container that provides one or more 802.16m system parameters assigned to the mobile station for an 802.16m time zone of the target base station, the 802.16m system parameters including one or more of: an 802.16m station ID, an 802.16m ranging code, a dedicated ranging slot or ranging resources within an 802.16m time zone, an 802.16m action time, and/or an 802.16m authentication parameter.

10. An apparatus comprising a processor, the apparatus configured to:
    transmit a handover request message from a legacy serving base station to a target updated base station, the request message including an indication that a mobile station is compliant with an updated standard specification of an orthogonal frequency division duplex multiple access (OFDMA) reference system, wherein the legacy serving base station is compliant with a legacy standard specification but not the updated standard specification, and the target updated base station is compliant with both the legacy standard specification and the updated standard specification; and receive a handover response message at the legacy serving base station from the target updated base station, the handover response message including one or more updated system parameters assigned to the mobile station for an updated time zone of the target updated base station and one or more legacy system parameters, wherein the one or more legacy system parameters are mapped to one or more corresponding updated system parameters by the mobile station or the target updated base station, wherein the time zone is an integer number of consecutive subframes.

11. A method comprising:

receiving, at a target updated base station from a serving legacy base station, a handover request message including an indication that a mobile station for handover is compliant with an updated standard specification of an orthogonal frequency division duplex multiple access (OFDMA) reference system, wherein the legacy serving base station is compliant with a legacy standard specification but not the updated standard specification, and the target updated base station is compliant with both the legacy standard specification and the updated standard specification;

allocating one or more updated system parameters to the mobile station for an updated time zone of the target updated base station; and transmitting a handover response message from the target updated base station to the serving legacy base station from the target updated base station, the handover response message including one or more updated system parameters assigned to the mobile station for an updated time zone of the target base station and one or more legacy system parameters, wherein the one or more legacy system parameters are mapped to one or more corresponding updated system parameters by the mobile station or the target updated base station, wherein the time zone is an integer number of consecutive subframes.

* * * * *